United States Patent [19]

Cheng

[11] Patent Number: 5,694,581
[45] Date of Patent: Dec. 2, 1997

[54] CONCURRENT DISK ARRAY MANAGEMENT SYSTEM IMPLEMENTED WITH CPU EXECUTABLE EXTENSION

[75] Inventor: Shyh-Chang Cheng, Taipei, Taiwan

[73] Assignee: Industrial Technology Research Institute, Taiwan, Taiwan

[21] Appl. No.: 346,475

[22] Filed: Nov. 29, 1994

Related U.S. Application Data

[63] Continuation-in-part of Ser. No. 116,979, Sep. 7, 1993, abandoned.
[51] Int. Cl.$^6$ .................................................. G06F 9/455
[52] U.S. Cl. .................................................. 395/500
[58] Field of Search .................................. 395/500, 823, 395/275, 482, 825; 368/54; 371/10.1, 8.1

[56] References Cited

U.S. PATENT DOCUMENTS

| | | | |
|---|---|---|---|
| 5,313,585 | 5/1994 | Jeffries et al. | 395/275 |
| 5,483,641 | 1/1996 | Jones et al. | 395/823 |
| 5,506,977 | 4/1996 | Jones | 395/482 |

*Primary Examiner*—Kevin J. Teska
*Assistant Examiner*—Matthew Loppnow
*Attorney, Agent, or Firm*—Finnegan, Henderson, Farabow, Garrett & Dunner, L.L.P.

[57] ABSTRACT

The present invention discloses a disk array access management system connected between a host computer and at least two independent concurrently operational disk arrays. Each of these arrayas includes a plurality of disks, the disk access management system includes a central processing unit (CPU) executable extension device directly accessible and executable by a CPU of the host computer. The disk access management system further includes a concurrent disk array interface device for interfacing with the concurrent disk arrays for performing disk accesses from the host computer to the disks. The CPU executable extension device is employed for initializing, configuring and controlling the concurrent disk array interface device in performing the concurrent disk accesses operations under direct control of the CPU. In a preferred embodiment of the disk access management system, the CPU executable extension device includes an array basic input-output system (BIOS) for including a plurality of instruction sets executable by the CPU for performing the disk access operation. The CPU executable extension device further includes a read only memory (ROM) for storing a plurality of configuration and initialization data therein to be employed by the CPU for initializing, configuring and controlling the concurrent disk array interface device in performing the concurrent disk accesses operations.

10 Claims, 9 Drawing Sheets

CONCURRENT DISK ARRAY MANAGEMENT SYSTEM IMPLEMENTED WITH CPU EXECUTABLE EXTENSION

This is a Continuation-In-Part (CIP) Application for a current application with Ser. No. 08/116,979 filed on Sep. 7, 1993 now abandoned by the same Applicant of this Patent Application.

BACKGROUND OF THE INVENTION

1. Field of the Invention

This invention relates generally to the system configuration of a computer or data processing system. More particularly, this invention relates to an intelligent data interface system for a central process unit (CPU) to concurrently access data in several disk arrays with improved data transmission speed and expanded data storage capacity and fault tolerance without requiring changes made to the operating system for maintain the resulting high performance computer system at a low cost level.

2. Description of the Prior Art

The level of performance for a computer or a data processing system is often limited by the slower speed of the input/output (I/O) operations. Specifically, in a personal computer system, the speed of I/O operation between a disk drive and the CPU frequently becomes the bottleneck of data transmission and as a consequence the performance of the entire system is degraded. For instance, the data transmission of a personal computer system equipped with a VESA local (VL) bus is 200 megabytes per second on the VL bus, i.e., 50 MHz. The CPU, even without a direct memory access (DMA), can exchange data with the VL bus at a rate of 20 to 25 megabytes per second. However, whenever a data I/O is required with a disk drive, the highest achievable speed only 5 megabytes per second and an average is only 1.5 megabytes per second, i.e., less than one percent of the data transfer rate of the VL bus. This low data transfer rate between the CPU and the disk causes great difficulty in the effort to improve the computational speed of a computer system.

The most popular interface system to a hard disk drive for a personal computer is commonly known as an intelligent disk electronics, i.e., IDE interface. One major advantage of the IDE disk drive is that the drive is compatible with the basic input/output system (BIOS) included in most commonly used operation system for the personal computers. Therefore no additional driver is required when the IDE disk drive is added on to a personal computer whether the operation system is a disk operation system (DOS) or a Window 3.X. An IDE disk can be conveniently connected to an Industrial Standard Adapter (ISA) bus through a simple data buffer and decoder. The IDE disk driver can be even connected to the higher speed data bus, such as the VL data bus, by simply plugged into some VL IDE chips which are commercially available. Few of these VL IDE chips include products such as APPINe's ADI2, UMC's UM820871, and PROMISE's PDC20230B.

As described above, due to the lower data transfer speed, the data exchange between the disk drive and the VL bus for transmitting to the CPU is still the bottleneck of the data flow. Compared to the data transfer rate of a VL bus, even if achievable to operate at a double speed as that claimed by some of the VL-IDE chip manufacturers, the I/O speed to the disk drive is still the major cause for limiting the speed of a computer. In order to provide a solution to overcome this limitation, the techniques of disk array which is used in the mainframe computers for the purpose of improving the I/O speed and the CPU-disk data transfer rate are briefly reviewed to determine if any of these technique are suitable for application to a smaller PC computer system.

Gordon et. al disclose in U.S. Pat. No. 5,148,432 entitled Arrayed Disk Drive System and Method, an arrayed disk drive system which includes a plurality of disk drives arranged in an arrayed configuration wherein the disk array is accessed by a plurality of channels and each channel accessing a plurality of disk drives. The logical configuration of disk array is controlled by a logic control means which provides a 'conceivable arrangement' of the disk drives to the computer which may appear to be many disk drives or a combined disk drive with integrated memory storage space or any combinations in between. The logic control means thus allows the logic configuration of the disk array to be flexibly adjusted to best suit the operational requirements.

The technique as disclosed by Gordon et al. provides a system architecture wherein access to the disk array may be more flexibly achieved by the use of multiple channels controlled by a logic control means. However, since there is no access to the disk array through these channels directly commanded by the CPU as all data transfer must be controlled through a separate logic control sub-system, the data transfer rate between the CPU and the disk array would still limit the operational speed of the computer system. Besides, the logic control sub-system must often process very complex logic steps to re configure the disk array by the use of software or firmware methods, which may further slow down the data access rate. The technique and system configuration disclosed by Gordon et al. would therefore be more suitable for main frame high speed computer equipped with large cache memory and large number of registers for high speed data access without the concern of low data transfer rate for access to disk drives. The method and system configuration in this Patent do not resolve the difficulties often encountered in the smaller and slower systems.

Milligan et al. disclose in another U.S. Pat. No. 5,124,987 entitled 'Logic Track Write Schedule System for A Parallel Disk Drive Array Data Storage Subsystem', a parallel disk drive array data storage subsystem which performs a mapping between virtual and physical data storage devices and schedule the writing of data to these devices. Array of redundancy disk drives with a multiple parallel data buses are employed to improve the performance level of larger and high speed computer systems. The improvement of system performance in this Patent is achieved by more efficiently mapping and scheduling the data transfer processes and thus eliminating redundancy data updates by the use 'virtual logical tracks' on 'logical cylinders' which may contain valid and invalid 'virtual tracks'. Milligan et al. disclose a technique for improving system performance by taking advantage of using the lower cost memory which is made commonly available by recent progress in the electronic industry. However, such solution is only useful for larger system where the computer has large CPU processing power to handle very complex mapping and scheduling tasks at high speed. For smaller systems, the problem of the low data transfer rate between the disks and the computer is still yet to be solved.

Several other U.S. Patents such as U.S. Pat. No. 5,101,492 (Schultz et al., 'Data Redundancy and Recovery Protection'), U.S. Pat. No. 5,155,835 (Belsan, 'Multi-level Hierarchical Dynamic Mapped Data Storage Subsystem'), U.S. Pat. No. 5,140,592 (Idleman et al., 'Disk Array System') and U.S. Pat. No. 5,088,081 (Farr, 'Method and Apparatus for Improved Disk Access') provide methods and apparatuses including disk array and distribution of data among disk array in order to more efficiently access the data and to increase the capability of data recovery and fault tolerance in the event of system malfunction. However, these methods are mostly applicable to main frame large computer systems where very complex operating system and the hardwares and softwares of major memory management and data storage subsystems must be modified in order to implement these techniques. Some high level design concepts disclosed in these Patents may be remotely relevant, however, they are generally not directly useful for the smaller, lower cost computer systems to overcome the limitation of a low data transfer rate between the disks and the CPU.

In order to overcome the aforementioned limitations, it must be taken into consideration that the smaller, lower cost computer systems are generally operated with CPUs with limited processing power. The system structure is quite simple and often primitive compared with high speed highly sophisticated mainframe computers. The capacity of data storage is still quite limited and the data transfer rate is limited because the CPU is not able to control several data buses in parallel. Standard operating systems such as DOS, Window, etc. are operated to manage standard data bus interfaces with peripheral devices, e.g., disk drives, printers, etc. The standard operation environments and system configurations form the constraints in providing practical technical solutions for improving the data transfer rate. For the purpose of developing a solution to overcome the limitation of low data transfer rate, special challenges are presented due to the limited data processing power, small data storage capacity, commonly used industry-wide interface standards and products for interfacing with the peripheral devices in the marketplace, and the requirement to maintain low cost in providing a solution to this system performance limitation. Meanwhile this need becomes more urgent as the processing power of the CPU of the smaller computer systems are advancing rapidly. Unless the data transfer rate can be significantly improved, substantial portion of the CPU power would be wasted in idling while waiting for the data arrival from the disks.

Therefore, there is still a need in the art of computer system architecture and disk drive configuration management for smaller and low cost computers to provide an economical and practical interface to overcome the above described limitations.

SUMMARY OF THE PRESENT INVENTION

It is therefore an object of the present invention to provide an interface system and method to overcome the aforementioned difficulties encountered in the prior art.

Specifically, it is an object of the present invention to provide an interface system and method to increase the data transfer rate between the disk array and the computer data bus by the use of existing standard techniques and products which are commercially available so that the performance can be improve without significantly increasing the cost.

Another object of the present invention is to provide an interface system and method which are compatible with the commonly available system hardwares and softwares and can be conveniently implemented without requiring system modifications.

Another object of the present invention is to provide a direct host-controlled disk array management system connected between a host computer controlled by an operating system executed thereon and at least two independent concurrently operational disk arrays wherein the disk array management system includes a CPU executable extension device implemented with a plurality of instruction sets for directly execution by the host CPU such that the rate of data transfer between the disk array and the host computer can be greatly improved without requiring a second CPU to locally control the disk array management system and the host computer and the disk array management system are controlled trader a single operating system.

Another object of the present invention is to provide an interface system and method which are simple yet still provide flexible and intelligent management schemes to handle the disk array space in a distributed or integrated manner with fault tolerance and data recovery features.

Briefly, in a preferred embodiment, the present invention discloses a disk array access management system connected between a host computer and at least two independent concurrently operational disk arrays. Each of these arrayas includes a plurality of disks, the disk access management system includes a central processing unit (CPU) executable extension device directly accessible and executable by a CPU of the host computer. The disk access management system furhter includes a concurrent disk may interface device for interfacing with the concurrent disk arrays for performing disk accesses from the host computer to the disks. The CPU executable extension device is employed for initializing, configuring and controlling the concurrent disk array interface device in performing the concurrent disk accesses operations under direct control of the CPU. In a preferred embodiment of the disk access management system, the CPU executable extension device includes an may basic input-output system (BIOS) for including a plurality of instruction sets executable by the CPU for performing the disk access operation. The CPU executable extension device further includes a read only memory (ROM) for storing a plurality of configuration and initialization data therein to be employed by the CPU for initializing, configuring and controlling the concurrent disk may interface device in performing the concurrent disk accesses operations.

It is an advantage of the present invention that the it provides an interface system and method to increase the data transfer rate between the disk array and the computer data bus by the use of existing standard techniques and products which are commercially available so that the performance can be improve without significantly increasing the cost.

Another advantage of the present invention is that it provides an interface system and method which are compatible with the commonly available system hardwares and softwares and can be conveniently implemented without requiring system modifications.

Another advantage of the present invention is that it provides an interface system and method which are simple yet still provide flexible and intelligent management schemes to handle the disk array space in a distributed or integrated manner with fault tolerance and data recovery features.

These and other objects and advantages of the present invention will no doubt become obvious to those of ordinary skill in the art after having read the following detailed description of the preferred embodiment which is illustrated in the various drawing FIGURES.

DETAILED DESCRIPTION OF THE PREFERRED EMBODIMENT

Figure 1:
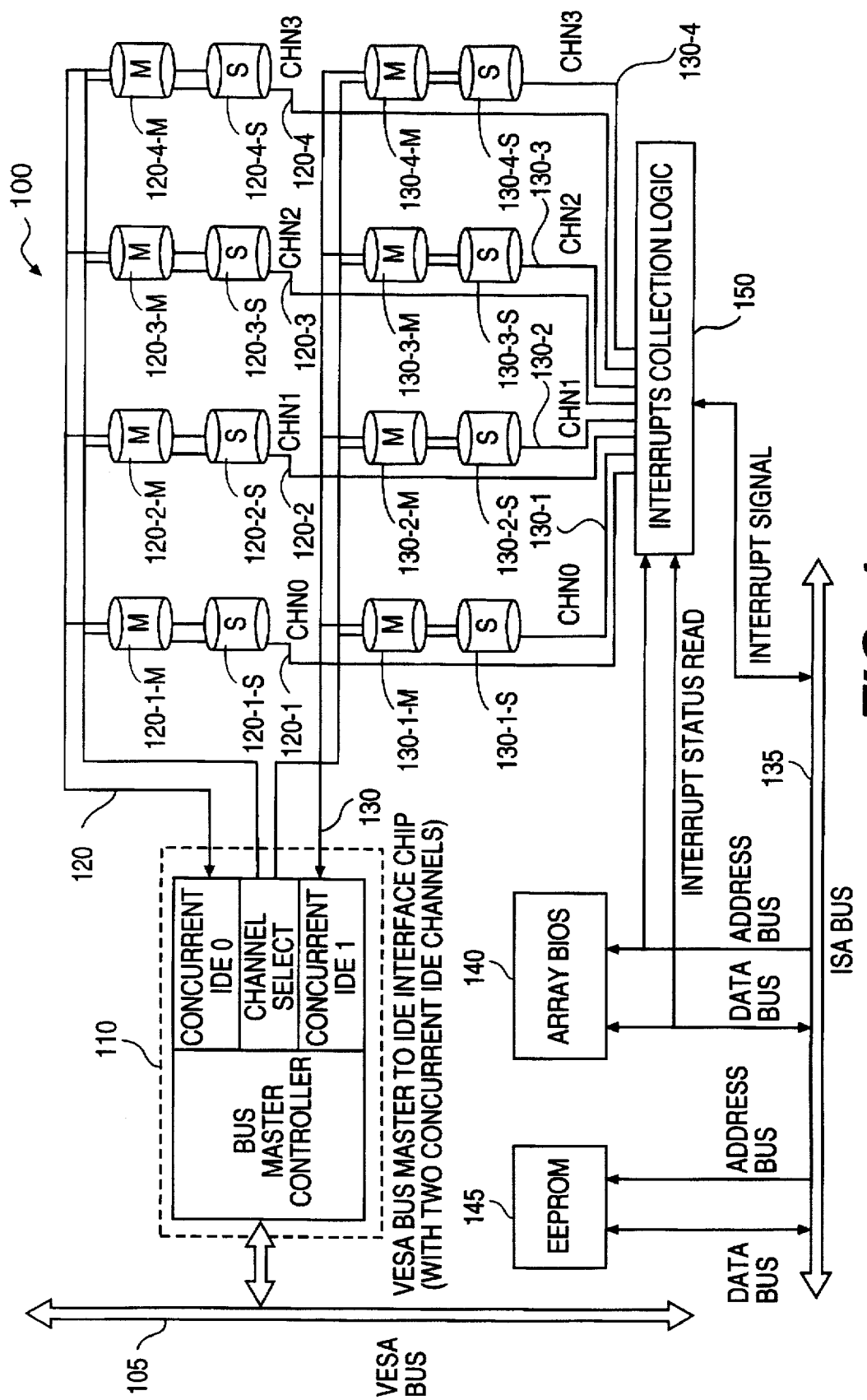
FIG. 1 is a block diagram showing a disk array interface system which is compatible and connected to a VESA local bus.

FIG. 1 shows a disk array interface system 100 which is compatible and connected to a VESA local bus 105. The VESA local bus is a 32-bit local bus which was first employed in an IBM PC-380. The VESA bus can achieve greater bandwidth and higher speed data transfer than an industrial standard adaptor (ISA) bus. For that reason, when there is higher data transfer speed requirement in various disk interface cards and for VGA display interface, a VESA bus is generally used. (A news paper advertisement is attached as Appendix A to show that VESA bus is well known in the art and requiring no further detail explanation.) The disk array interface system 100 is preferably an IDE disk array interface system which includes a VESA bus master to IDE interface chip 110. (More detail description of the VESA bus master to IDE interface chip 110 will be provided below in the description of FIG. 4.) The VESA bus master to IDE interface chip 110 is connected to two concurrent IDE channels, i.e., IDE channels 120 and 130, wherein each includes four dependent IDE subchannels, i.e., dependent subchannels 120-1 to 120-4 and 130-1 to 130-4 and each dependent subchannel is connected to two disks, i.e, disks 120-1-M, 120-1-S, 120-2-M, . . . , 130-4-M, 130-4-S. These two concurrent IDE channels, i.e., channels 120 and 130, can independently operate concurrently. The dependent subchannels 120-1 to 120-4 and 130-1 to 130-4 cannot operate independently from another subchannel but can independently receive subchannel commands to perform data access in each of the connected disks, i.e, disks 120-1-M, 120-1-S, 120-2-M, . . . , 130-4-M, 130-4-S. The disk array interface system 100 thus enables data storage and retrieval from sixteen disks via two independent concurrent IDE channels 120 and 130. The VESA bus master to IDE interface chip 110 enables the data transfer to be performed concurrently on IDE channels 120 and 130. The data transfer rate on each of the concurrent IDE channels 120 and 130 is six megabytes per second (6 MB/s) while the data transfer rate between the VESA bus 105 and the VESA bus master to IDE interface chip 110 is 20 MB/s. Thus the maximum data transfer speed of the disk array interface system can be doubled than the conventional disk array interface systems.

The disk array interface system 100 also includes an array basic input/output system (BIOS) 140 connected, via a data bus and an address bus, to an industrial standard adaptor (ISA) bus 135 which is connected to a main processor, e.g., a motherboard to provide disk array control signals. The ISA bus was first employed in an IBM-AT system as an I/O bus. The interface structure of ISA was then employed for the development of many subsequent interface cards for IBM AT used in different applications. An ISA data bus structure thus becomes an industrial standard. The array BIOS 140 provides three functions: (i) runtime RAID-0 BIOS function; (ii) runtime RAID-1 BIOS function; and (iii) executing initialization routine and setup utility of personal computer (PC) add-on card. Each of these functions will be further described below. The instructions stored in array BIOS 140 can be directly executed by the central process unit (CPU) of the host computer. Therefore, there is no change of the operation system (OS) for operation of the host computer required to implemented this disk array interface system. The program execution of the CPU in the host computer can be branched to execute the instructions residing on the array BIOS 140 and then transferred back when disk array interface for data access is completed. Connected to the ISA bus 135, via a data bus and an address bus, is also a disk configuration storage means 145 which is preferably an electrical erasable programmable read only memory (EEPROM) to store the RAID configuration data. The disk array interface system 100 further includes an interruption collection logic 150 which collects 'interrupts' from the disk arrays, i.e., disks 120-1-M, 120-1-S, . . . , 130-4-S, when a read/write request from the array BIOS 140 is received from the ISA bus 135. More details of the use of these interrupts will be explained below in the description of FIG. 3. The interrupt collection logic 150 then applies the received interrupts to cooperate with the VESA bus master to IDE interface chip 110 to control the performance of read/write operations for each channel as selected by the VESA bus master to IDE interface chip 110.

Figure 2:
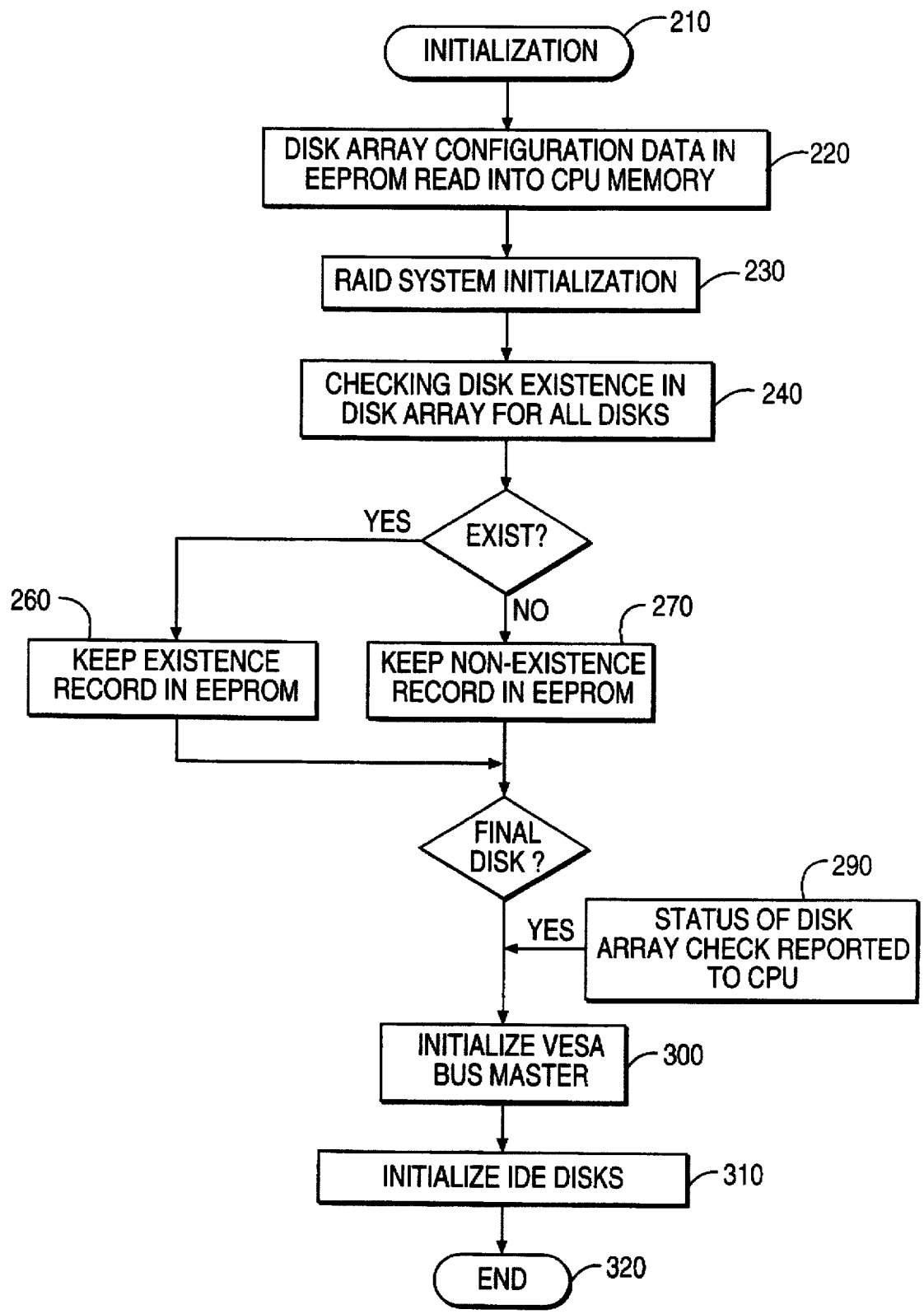
FIG. 2 is a flow chart showing the operational sequences of system initialization for a personal computer system including a disk array interface system of FIG. 1.
Figure 3:
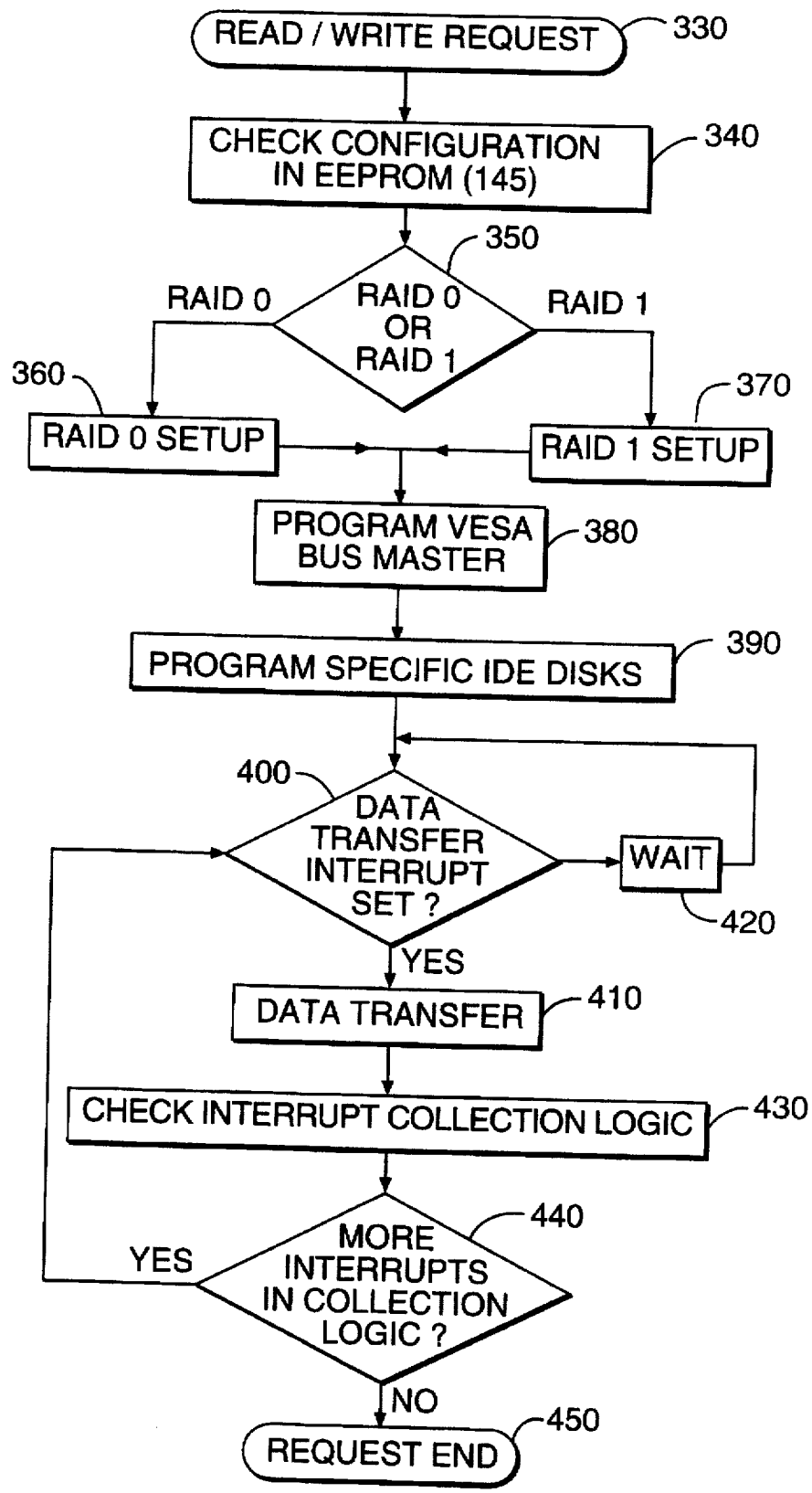
FIG. 3 is a flow chart showing the operational sequences performed by a host central processing units (CPU) and the interface system in response to a read/write request.

FIGS. 2 and 3 are a flow charts showing the functions and sequences of performance executed by the disk array interface system 100 to accomplish the task that a small computer system such as a personal computer (PC) directly controls of the access to a plurality of disks, e.g., disks 125-1-M, 125-1-S, . . , 130-4-S, without requiring the change of the operating system (OS) of this personal computer system. When a personal computer system is turned on or rebooted, an initialization process begins (step 210). An disk array configuration data stored in the EEPROM 140 is first read into the memory of the host computer (step 220). The configuration data stored in the EEPROM 145 includes the disks connected to the disk array, which of these disks are operating with RAID0 and RAID1. The EEPROM 145 also stores data of the initialization modes of the VESA master to IDE interface chip 110. The initialization process is then branched to array BIOS 140 to perform a RAID system initialization process (step 230). The status of the disk array is checked by first confirming the existence of each disk, i.e., disk 120-1-M, 120-1-S, . . . , 130-4-M, 130-4-S (step 240). If one of the disks is determined to be in connection to the disk control system 100 (step 250), the 'existence of the disk' is confirmed, then the existence record of that disk is maintained in the EEPROM 145 (step 260). Otherwise, an non-existence record is kept in the EEPROM 140 (step 270). This process is iterated until the final disk, e.g., disk 130-

4-S, is checked (step 280). The status of disk array check is reported back to the CPU of the host personal computer (step 290). Under the command of the operation system (OS) of the CPU, the VESA bus master 110 is then initialized (step 300). The VESA bus master to IDE interface chip 110 is initialized to operate at a 16-bit or 32-bit mode with a specific data transfer speed and prefetch mode. Subsequently, all the disks of the disk array, i.e., disks 120-1-M, 120-1-S, ..., 130-4-M, are then initialized (step 310) to define the operational characteristics of the disk, e.g., block transfer and sector transfer parameters for data read/write operations, before the initialization process is ended (step 320). Whenever the OS of the host computer issues a command to access the data stored in the disk array 120-1-M to 130-4-S, the OS executes the disk array access instructions stored in array BIOS 140. While the OS in of the host CPU executes the access instructions stored in array BIOS 140, the EEPROM 145 provides the disk array configuration data for indications of disks in the disk array are active and and the operation modes, i.e., RAID0 or RAID1, of each disk.

Please refer to FIG. 3 now when a read/write request is received from the CPU of the host personal computer (step 330), the execution of the program performed by the OS in the CPU is branched to the instruction set contained in the array BIOS 140 to carry out the disk access tasks. The configuration of the disk array 120-1-M to 130-4-M is first checked by examining the data stored in the EEPROM 145 (step 340). A check is first made to determine if the disk configuration is a RAID0 or a RAID0 configuration (step 350) (More details about the RAID0 and RAID1 data access algorithms will be explained below). Depending on the result of the check, RAID0 set up (step 360) or RAID1 setup (step 370) is performed. The disks which are operated under either RAID0 or RAID1 are identified and local operational parameters of each disk for the these identified disks are fetched into the CPU memory as operational parameters for executing the read/write request. The VESA bus master to IDE interface chip 110 is programmed (step 380) by the host CPU to schedule the data access activities according to the RAID0 or RAID1 configurations, the transfer data block size, the data access sources and destination based on the read/write request. Specific disks are then programmed to schedule each identified disk the addresses and size of data for read/write operation to complete the preparation for data transfer actions (step 390).

At the beginning of an actual data transfer for a specific disk, a check must be made to determine if an interrupt is set (step 400). When an interrupt is set, it provides an indication that either the disk buffer is ready to receive incoming data for write operation or the disk buffer received data ready to be fetched in a read operation. A data transfer operation is executed when the interrupt is set (step 410), otherwise a wait state is set waiting for next interrupt to be set for that disk (step 420). After the completion of a data transfer in step 410, the interrupt data stored in the interrupt collection logic 150 is checked (step 430) to determined if there are additional interrupts (step 440) to be carried out. The read/write operation continues by looping back to check the interrupt set signal (step 400) for executing the data transfer for next interrupt. Otherwise, the tasks to be performed for the read/write request are completed and the process ends for that particular data transfer activity (step 450).

Figure 4:
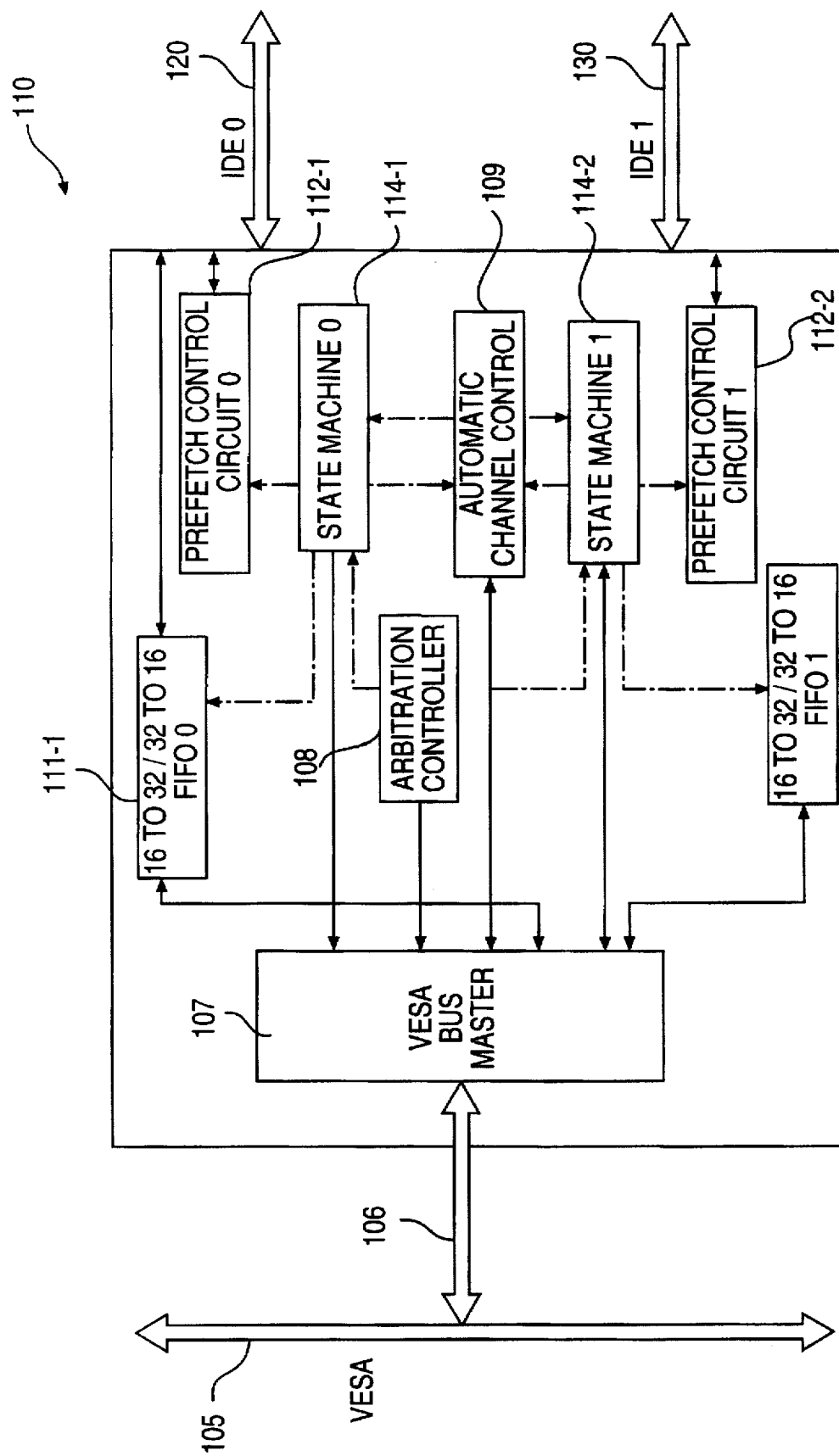
FIG. 4 is a functional block diagram showing the internal structure of the VESA bus master to DE interface chip of FIG. 1.
Figure 5:
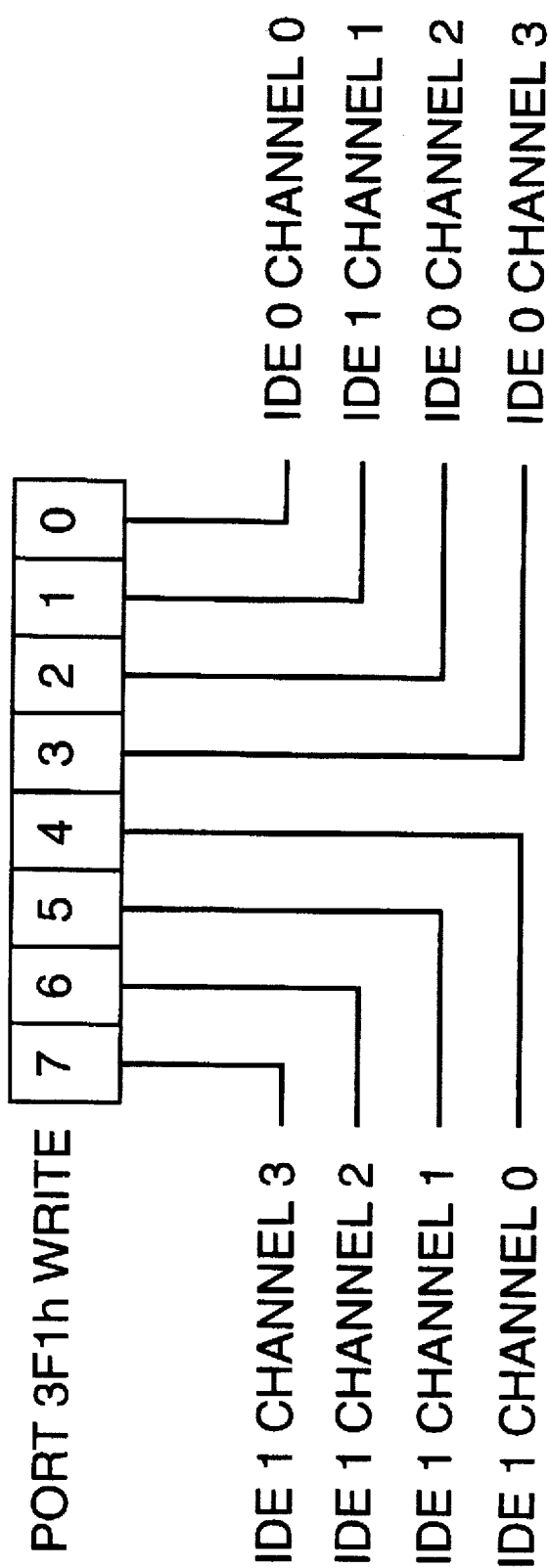
FIG. 5 is a bit pattern of a input output (I/O) port of an automatic subchannel control for selection of subchannels.

Please refer to FIG. 4 where a functional block diagram for the VESA bus master to IDE interface chip 110 connected to the VESA bus 105 via a data bus 106 is shown. The interface chip 110 further includes two sets of state machines 114-1 and 114-2 for controlling the timing of the data transfers, first-in-first-out (FIFO) buffers 111-1 and 111-2 for stored prefetched data, and prefetch control circuits 112-1 and 112-2 for prefetching data for storing in the FIFO buffers 111-1 and 111-2. These two sets of functional blocks are used for carrying out data transfer between the two independent concurrent IDE disk array 120 and 130 respectively. These two sets of disk array interface blocks are controlled by an arbitration controller 108 and an automatic channel control 109. The arbitration controller 108 controls the priority and timing of the data transfer between the two concurrent IDEs 120 and 130. A very simple arbitration algorithm can be employed by the arbitration controller 108. For example, in a data data read from disk operation, a data transfer is conducted for an IDE whenever the FIFO buffer for that IDE is full while the other FIFO is not. In the situation when both buffers are full and ready for transfer, the read data activity is designated to begin with IDE0 by default. This simple arbitration algorithm can be implemented in the VESA bus master to IDE interface chip 110 by either hardware or software. For the consideration of data transfer speed, a hardware implementation is used for the arbitration controller 108. The automatic channel selection control includes a channel selection logic and an input/output (I/O) port. The channel selection logic is controlled by the CPU when executing the instruction sets in the array BIOS 140 to set the bit patterns of the I/O port, i.e., port 3F1h, as that shown in FIG. 5. Each bit of port 3F1h is mapped to the specific subchannel for controlling the activation of each subchannel, i.e., subchannel 120-1 to 120-4 and 130-1 to 130-4.

Therefore, with a functional block structure as that shown for the VESA bus master to IDE interface chip 110, three levels of data transfer control are provided. The VESA bus master 107 controls the priority and scheduling for transferring data to the VESA bus 105 via the connecting bus 106. The arbitration controller 108 controls the priority and scheduling of the data transfer for data stored temporarily in the first IDE FIFO buffer 111-1 or the second IDE FIFO buffer 111-2 to the VESA bus master 107. The selection of the dependent subchannels for disk access are controlled by the automatic channel selection 109. The arbitration controller 108 may execute simple arbitration algorithm to control internal data transfer between the FIFOs 111-1 and 111-2 and the VESA bus master 107. The data transfer between the dish and the chip 110 can be carried out concurrently via the IDE0 and IDE1 buses 120 and 130. While the data transfer between the chip 110 and the VESA bus 105 and the subchannel selection for data access to a plurality of disk in the disk array are under direct control of the host CPU executing the instruction sets residing in the array BIOS 140. The array BIOS 140, the EEPROM 145, and the interrupts collection logic 150 thus forms a CPU executable extension providing executable instruction sets in array BIOS 140 and accessible memory for storing/collecting configuration/initialization/interrupt data in EEPROM 145 and interrupt logic collection 150. The CPU executable extension, i.e., the array BIOS 140, the EEPROM 145, and the interrupts collection logic 150, initializes, configures and controls the VESA bus master to IDE interface chip 110, i.e., a CPU to multiple concurrent disk array interface, to carry out concurrent data transfer tasks. For convenience of implementation, the CPU executable extension, i.e., the array BIOS 140, the EEPROM 145, and the interrupts collection logic 150, and the CPU to multiple concurrent disk array interface, i.e., the VESA bus master to IDE interface chip 110 are built into a single printed circuit board (PCB) or can even be integrated into an application specific integrated circuit (ASIC) if the market situation justifies the costs of ASIC design and fabrication. By the use of this system configuration, i.e., the CPU executable extension and the CPU to multiple concurrent disk array interface, the disks in the disk arrays can be replaced by different video or audio digital data storage media such as compact disks (CDs). The modifications of the system configurations can be conveniently accomplished by modifying the data stored in the EEPROM 145. For instance, if the some of the disks are replaced by CD-ROM (read only memory), then the data stored in EEPROM 145 has to indicate some of the disks are for read operation only. Since the IDE buses can provide about 10 Mb/sec data transfer rate and the VESA/PCI bus can achieve a transfer rate of 200 Mb/sec, the system configuration disclosed in the present invention can be expanded to include a more than two disk arrays by adjusting the arbitration controller 108, the automatic channel selection control 109, and by changing the data stored in the EEPROM 145.

The present invention thus discloses a disk array access management system 100 connected between a host computer and at least two independent concurrently operational disk arrays, i.e., IDE0 (120) and IDE1 (130), each including a plurality of disks. The disk access management system 100 comprises a central processing unit (CPU) executable extension device, i.e., the array BIOS 140, the EEPROM 145, and the interrupts collection logic 150, which is directly accessible and executable by a CPU of the host computer. The disk access management system also includes a concurrent disk array interface device, i.e., the VESA bus master to IDE interface chip 110, for interfacing with the concurrent disk arrays for performing disk accesses from the host computer to the disks. The CPU executable extension device is employed for initializing, configuring and controlling the concurrent disk array interface device in performing the concurrent disk accesses operations under direct control of the CPU.

Figure 6:
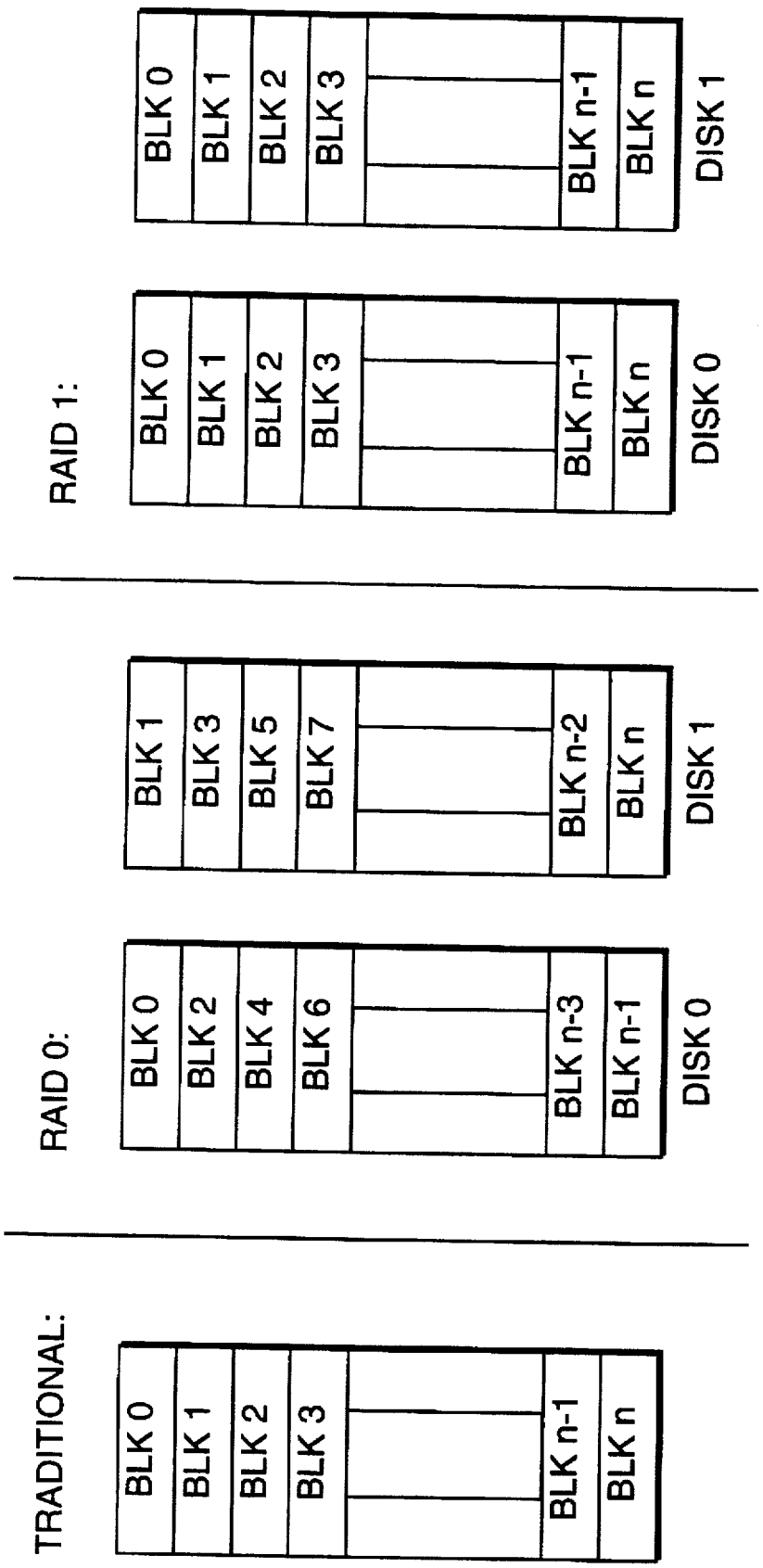
FIG. 6 is a data distribution diagram showing several kinds of disk access management schemes RAID0 and RAID1 implemented in the present invention compared with the traditional single disk personal computer system.

In addition to the speed improvement through the concurrent disk or other storage-media data access operations, under the control of the CPU executable extension and the CPU to concurrent storage-media interface 110, the data can be distributed among different disks thus allowing the computer to manage multiple disks in the disk array system as an integrated disk. Taking advantage of the flexibility as the result of applying the subchannels, two kinds of algorithms, i.e., RAID0 and RAID1 are implemented in the firmware included in the array BIOS 140 which makes good use of the redundant array of inexpensive disk to increase the fault tolerance of the system. RAID0 algorithm converts a writing instruction issued by the computer to a writing instruction to write the data in a distributed manner among several disks in a parallel fashion. RAID1 algorithm writes the data to be stored in the disks in a mirror symmetrical fashion in two disks simultaneously whereby when there is faulty sector in any of the disks, there would be the same data stored in a different sector on a different disk that can be retrieved as the back. FIG. 6 illustrates the manners of data distributions as performed by the RAID1 and RAID0 algorithms and compares them the traditional scheme. In order to carry out the RAID0 or RAID1 schemes for disk access management, the VESA bus master to IDE interface chip 110 and can be programmed by specifying the data sources and data destination (see step 380 in FIG. 3) under the control of the host CPU executing instruction sets residing in the array BIOS 140. The corresponding disks to be accessed are also programmed with disk data buffer and specific blocks and sectors ready for read/write operations in response to a RAID0 or RAID1 access request.

For modem high data transfer rate and multi-media operations, data storage and access schemes such as RAID0 and RAID1 are becoming more important for the purpose of increasing fault tolerance and reducing the possibility of data loss without unduly impose extra heavy burdens of backing up data frequently. For a personal computer system, there are many available operating systems in the market including more popular OS such as DOS, Window, Apple System 7.1, Microsoft NT, etc. However, none of them provides both RAID0 and RAID1 features. Typical disk array interface systems for a personal computer generally involves a separate disk array processor to operate independently from the host CPU. The hardware and software interface between the disk array processor and the host CPU becomes very complicate. The cost of implementation thus becomes very high due to the complex design and implementation requirements. In this invention, the RAID0 and RAID1 algorithm can be packaged in the array BIOS 140 as instruction sets executable by the host CPU. The disk array control system of the present invention including the CPU executable extension, RAID0 and RAID1 disk management schemes can be conveniently implemented at very low cost without using a separate disk management processor and without requiring changes to the operating system of a personal host computer.

Figure 7:
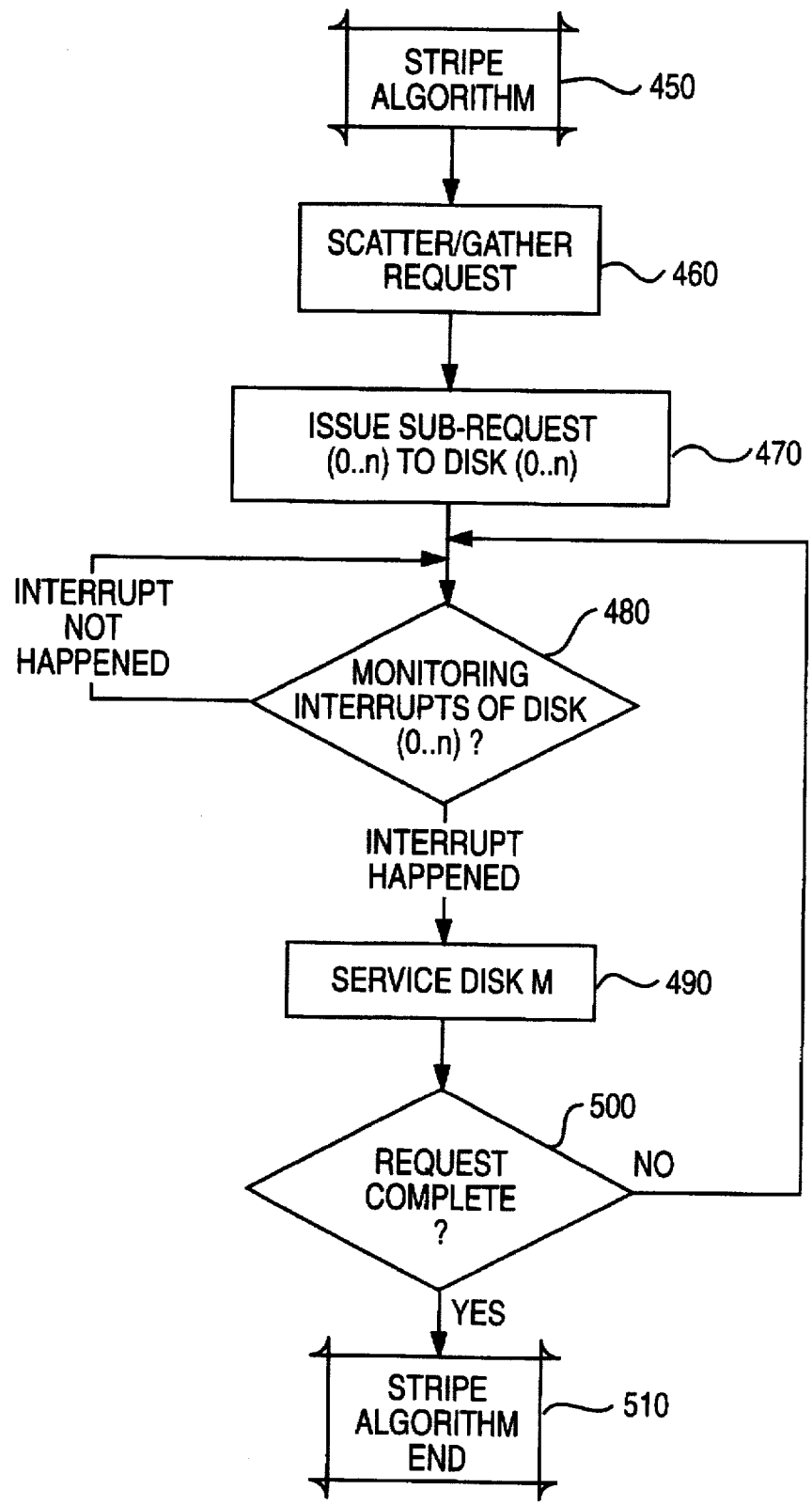
FIG. 7 is a flow chart showing the operational steps exeuted by a host CPU applying the instruction sets in an array BIOS for carrying out a RAID0 BIOS algorithm.

FIG. 7 is a flow chart showing the operational steps executed by a host CPU applying the instruction sets residing in the array BIOS 140 for performing a RAID0 BIOS algorithm. The process begins by identifying, via the configuration data stored in EEPROM 145, that a RAID0, i.e., stripe algorithm is to be performed (step 450). A disk operating system (DOS) scatter/gather request is processed (step 460) wherein the scatter command is a write request to write the data among several disks while a gather command is a read request is to collect data blocks from several disks. A request to access subchannel 0,1,2,3, . . . ,n is issued based on the scatter/gather request received (step 470). The interrupts of disks 0 to n are monitored to find a time window for disk access (step 480). If an interrupt for disk m occurs, where m is a positive integer and 0≦m≦n, then access to disk m is performed (step 490), otherwise, the interrupt monitoring process (step 480) is repeated. The above sequence of operations is repeated for every the requested disks (step 500) and the process ends (step 510) when all the requested disks are processed, i.e., serviced.

Figure 8:
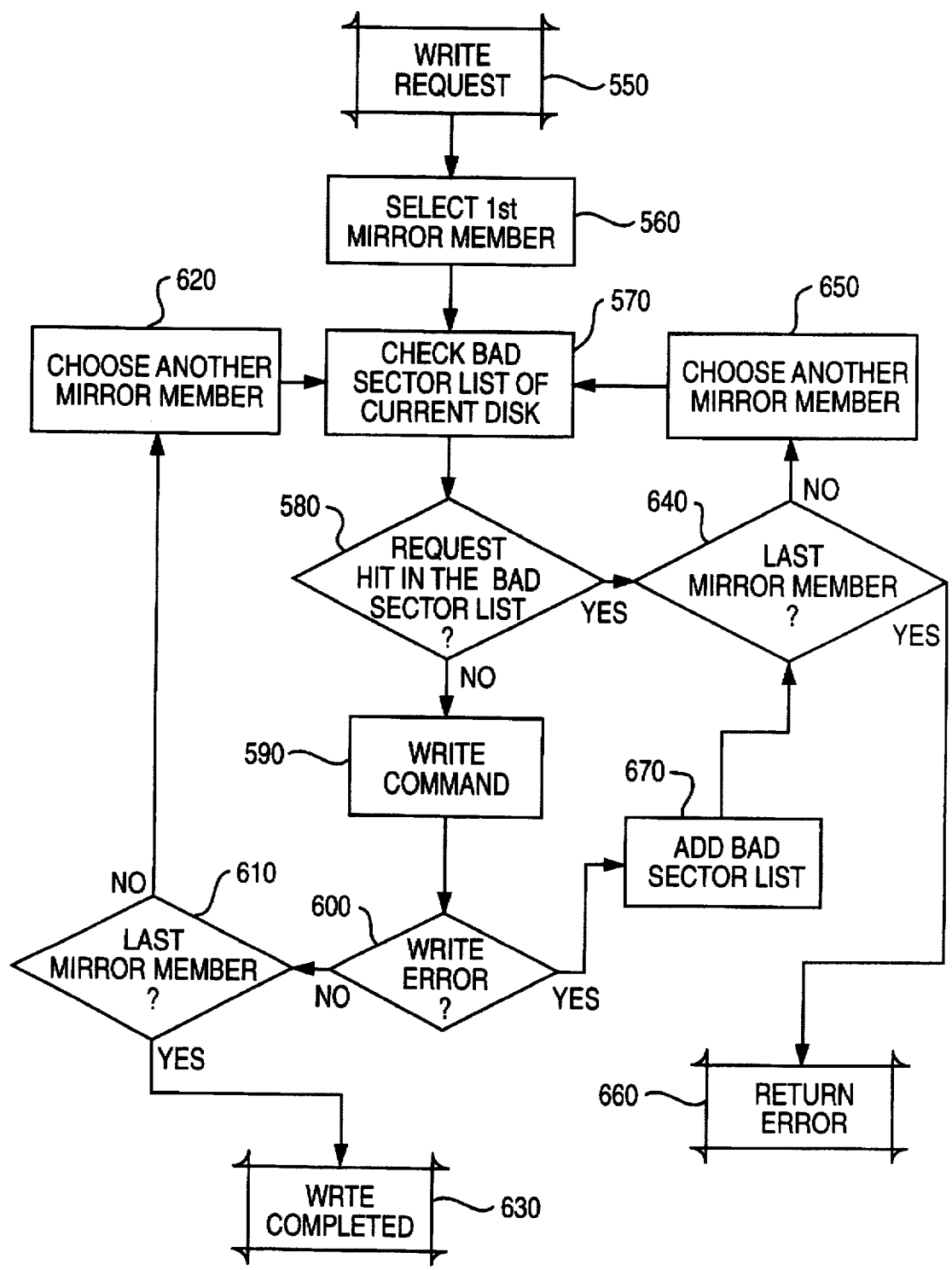
FIG. 8 is a flow chart showing the operational steps exeuted by a host CPU applying the instruction sets in an array BIOS for carrying out a RAID1 BIOS mirror write algorithm.

FIG. 8 is a flow chart showing the operational steps executed by a host CPU applying the instruction sets residing in the array BIOS 140 for performing a RAID1 BIOS write algorithm. The process begins by identifying, via the configuration data stored in EEPROM 145, that a RAID1 write algorithm is to be performed (step 550) and a series of disks are selected (step 560) for writing the data based on the write request the selected disk list is compared to the disk array configuration information (step 570) to determine if a bad sector contained in the current list of disks (step 570). A check is then made to determine if the request to write data hit the bad sector list (step 580). If the write request does not hit the bad sector list, the the write command is executed (step 590) to write data to the destination sector, and a write error check is performed (step 600) to determine if any error occurs in the process of data writing. If there is no error in the data writing process, a check is made to determine if this is a last mirror member of disk for writing the data (step 610), if it is not, then another mirror member disk is chosen (step 620) for writing the identical data to that sector.

Otherwise, if the disk current under process is the last mirror member disk, then the write data process is ended (step 630). When the write request hits a bad sector in step 580, a check is made to determine if the bad sector occurs in a last mirror member (step 640), if it is not, then another mirror member disk is chosen (step 650) for repeating the data writing process again. On the other hand, if the bad sector occurs in a last mirror member disk (step 640), then a return error message is processed and sent back to CPU (step 660). In the process of writing the data to a sector, if a write error occurs, a bad sector is added to the bad sector list (step 670) and also a check is made to determine if the write error occurs to the last mirror member or not (step 640). The result of the check is then used for further carrying out processing steps as described above.

Figure 9:
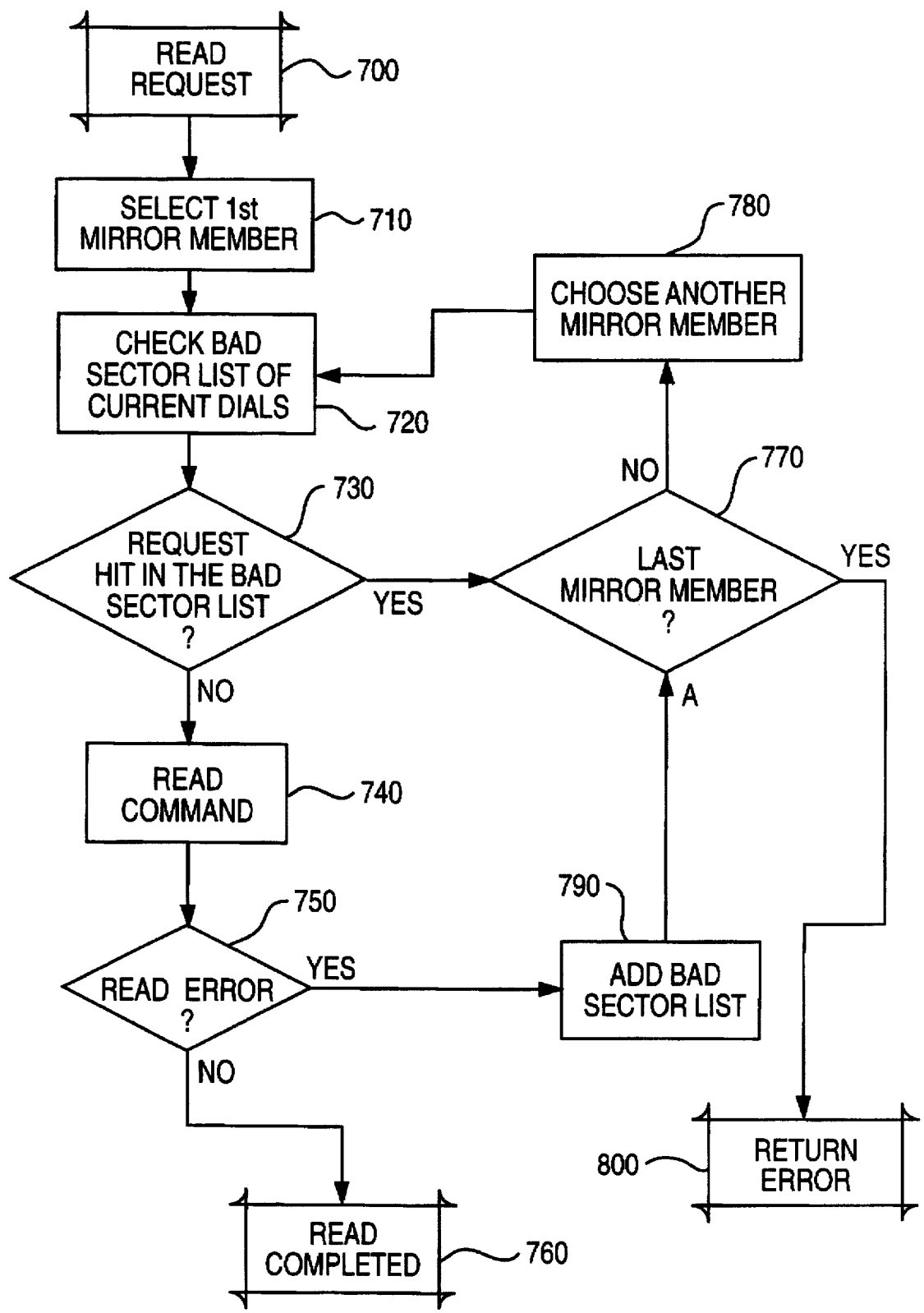
FIG. 9 is a flow chart showing the operational steps exeuted by a host CPU applying the instruction sets in an array BIOS for carrying out a RAID1 BIOS mirror read algorithm.

FIG. 9 is a flow chart showing the operational steps executed by a host CPU applying the instruction sets residing in the array BIOS 140 for performing a RAID1 BIOS read algorithm. The process begins by identifying, via the configuration data stored in EEPROM 145, that a RAID1 read algorithm is to be performed (step 700) and a first mirror member disk is selected (step 710) for reading the data based on the read request the selected first mirror member disk is compared to the disk array configuration information (step 720) to determine if a bad sector contained in the current disk for reading the data and if the request to sector for reading data hit the bad sector list (step 730). If the read request does not hit the bad sector list, the the read command is executed (step 740) to read data from the sector, and a read error check is performed (step 750) to determine if any error occurs in the process of data reading. If there is no error in the data reading process, the task in response to the read request is completed (step 760). When the read request hits a bad sector in step 730, a check is made to determine if the bad sector occurs in a last mirror member (step 770), if it is not, then another mirror member disk is chosen (step 780) for repeating the data reading process again by looping back to step 720. On the other hand, if the bad sector occurs in a last mirror member disk in step 770), then a return error message is processed and sent back to CPU (step 800). In the process of reading the data from a sector, if a read error occurs, a bad sector is added to the bad sector list (step 790) and also a check is made to determine if the read error occurs to the last mirror member or not (step 770). The result of the check is then used for carrying out further processing steps as described above.

The present invention thus provides a disk access management system to increase the data transfer rate between the disk array and the computer data bus by using of existing standard techniques and products so that the performance is improved without significantly increasing the cost. The commonly available system hardwares and softwares and can be conveniently implemented in the disk access management system without requiring system modifications. It also provides flexible management schemes to manage the disk access in a distributed or integrated manner with fault tolerance and data recovery features.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A direct host controlled disk array access management system connected between a host computer controlled by running an operating system program thereon and at least two independent concurrently operational disk arrays, each including a plurality of disks, the disk access management system comprising:

a central processing unit (CPU) executable extension device directly accessible and executable by a CPU of said host computer wherein said CPU executable extension device implemented with a plurality of instruction sets of said operating system program for direct control by said CPU in running said operating system employing said instruction sets;

a concurrent disk array interface device for interfacing with said concurrent disk arrays for performing disk accesses from said host computer to said disks; and said CPU executable extension device being employed for initializing, configuring and controlling said concurrent disk array interface device in performing the concurrent disk accesses operations under direct control of said CPU of said host computer in running said operating system program employing said instruction sets.

2. The direct host-controlled disk access management system of claim 1, wherein:

said CPU executable extension device includes an array basic input-output system (BIOS) for including a plurality of said instruction sets executable by said CPU of said host computer for performing said disk access operation; and said CPU executable extension device further includes a read only memory (ROM) for storing a plurality of configuration and initialization data therein to be employed by said CPU of said host computer for initializing, configuring and controlling said concurrent disk array interface device in performing said concurrent disk accesses operations in running said operating system program in said host computer.

3. The direct host-controlled disk access management system of claim 1 further comprises:

a plurality of sub-channels, each of which being employed for connecting each of said disks in said independent concurrent disk arrays to said concurrent disk array interface device and said CPU executable extension device whereby said disk access operations being performed in a manner among several disks through said distributed sub-channels.

4. The direct host-controlled disk access management system of claim 3 wherein:

said sub-channels being employed by said concurrent disk array interface device in reading data from or writing data to a plurality of said disks using a RAID0 scheme by reading from or writing to cache of said disks in substantially a symmetrically distributive manner, or a RAID1 scheme by redundantly writing a block of data as a mirror image to two of said disks for increasing fault tolerance thus reducing the possibility of loss of data.

5. The direct host-controlled disk access management system of claim 4 wherein:

said CPU executable extension device further includes an interrupt collection logic for collecting a plurality of interrupts from each of said sub-channels provided for said CPU of said host computer in controlling the timing of performing said disk access operation to each of said disks.

6. The direct host-controlled disk access management system of claim 3 wherein:

said concurrent disk array interface device further including a bus master for interfacing with a local bus of said host computer, a buffer for each of said disk arrays and a arbitration controller for managing the priority and timing of data transfer between said buffer for each of concurrent disk arrays to said bus master.

7. The direct host-controlled disk access management system of claim 6 wherein:

said concurrent disk array interface device further including an automatic channel control means for controlling the disk access to specific disks through different selected subchannels.

8. The direct host-controlled disk access management system of claim 7 wherein:

said concurrent disk array interface device further including a state machine for each of said concurrent disk arrays for controlling the timing of the data transfers, and a pre-fetch control means for each of said concurrent disk arrays for controlling the pre-fetch of data to said data buffer.

9. A direct host-controlled disk array access management system connected between a host computer controlled by running an operating system program thereon and at least two independent concurrently operational disk arrays, each including a plurality of disks, the disk access management system comprising:

a central processing unit (CPU) executable extension device directly accessible and executable by a CPU of said host computer wherein said CPU executable extension device implemented with a plurality of instruction sets of said operating system program for direct control by said CPU in running said operating system employing said instruction sets;

a concurrent disk array interface device for interfacing with said concurrent disk arrays for performing disk accesses from said host computer to said disks;

said CPU executable extension device being employed for initializing, configuring and controlling said concurrent disk array interface device in performing the concurrent disk accesses operations under direct control of said CPU of said host computer in running said operating system program employing said instruction sets;

said CPU executable extension device includes an array basic input-output system (BIOS) for including a plurality of said instruction sets executable by said CPU of said host computer for performing said disk access operation; and said CPU executable extension device further includes a read only memory (ROM) for storing a plurality of configuration and initialization data therein to be employed by said CPU of said host computer for initializing, configuring and controlling said concurrent disk array interface device;

said concurrent disk array interface device further including a state machine for each of said concurrent disk arrays for controlling the timing of the data transfers, and a pre-fetch control means for each of said concurrent disk arrays for controlling the pre-fetch of data to said data buffer.

10. A method for managing disk array access by employing a disk management system connected between a host computer controlled by running an operation system program thereon and at least two independent concurrently operational disk arrays, each including a plurality of disks, the disk access management method comprising the steps of:

(a) utilizing a concurrent disk array interface device for connecting to and interfacing with said concurrent disk arrays; and (b) utilizing a central processing unit (CPU) executable extension device, provided for executing a plurality of instruction sets of said operating system program and being directly accessible and executable by a CPU of said host computer for initializing, configuring and controlling said concurrent disk array interface device in performing the concurrent disk accesses operations under direct control of said CPU of said host computer in performing said disk accesses from said host computer to said disks with said CPU running said operating system employing said instruction sets.

* * * * *

UNITED STATES PATENT AND TRADEMARK OFFICE
CERTIFICATE OF CORRECTION

PATENT NO. : 5,694,581
DATED : December 2, 1997
INVENTOR(S) : Cheng

It is certified that error appears in the above-indentified patent and that said Letters Patent is hereby corrected as shown below:

Title page, Item [57], line 4 of the Abstract, "arrayas" should read --arrays--.

Title page, Item [73], line 2 under "Assignee," "Taiwan, Taiwan" should read --Taiwan, Republic of China--.

Claim 4, column 13, line 6, "a arbititration" should read --an arbitration--.

Signed and Sealed this

Seventeenth Day of August, 1999

Attest:

Q. TODD DICKINSON

*Attesting Officer*         *Acting Commissioner of Patents and Trademarks*